(12) United States Patent
Newbold

(10) Patent No.: US 12,403,804 B2
(45) Date of Patent: Sep. 2, 2025

(54) ARMREST CONTROL MECHANISM FOR PASSENGER SEAT

(71) Applicant: Safran Seats USA LLC, Gainesville, TX (US)

(72) Inventor: Tyler L. Newbold, Sherman, TX (US)

(73) Assignee: Safran Seats USA LLC, Gainesville, TX (US)

( * ) Notice: Subject to any disclaimer, the term of this patent is extended or adjusted under 35 U.S.C. 154(b) by 167 days.

(21) Appl. No.: 18/376,250

(22) Filed: Oct. 3, 2023

(65) Prior Publication Data

US 2025/0108742 A1    Apr. 3, 2025

(51) Int. Cl.
*B60N 2/75* (2018.01)
*B64D 11/06* (2006.01)

(52) U.S. Cl.
CPC .......... *B60N 2/753* (2018.02); *B64D 11/0644* (2014.12)

(58) Field of Classification Search
CPC ..... B60N 2/753; B60N 2/763; B64D 11/0644
See application file for complete search history.

(56) References Cited

U.S. PATENT DOCUMENTS

| 9,955,779 | B2 * | 5/2018 | Hoeftberger | B60N 3/007 |
|---|---|---|---|---|
| 10,870,489 | B2 * | 12/2020 | Dowty | B60N 2/77 |
| 11,584,530 | B2 * | 2/2023 | Kodati | B64D 11/0606 |
| 11,618,573 | B2 * | 4/2023 | Hoover | B64D 11/06395 |
| | | | | 297/411.32 |
| 12,030,642 | B2 * | 7/2024 | Jasny | E05B 47/00 |
| 2010/0326331 | A1 * | 12/2010 | St. Louis | B64D 11/00 |
| | | | | 108/44 |
| 2012/0112503 | A1 * | 5/2012 | Masutani | B60N 2/42754 |
| | | | | 297/216.1 |
| 2021/0269159 | A1 | 9/2021 | Hoover | |

OTHER PUBLICATIONS

EP24202570.8, "Extended European Search Report", Jan. 8, 2025, 6 pages.

* cited by examiner

Primary Examiner — Philip F Gabler
(74) Attorney, Agent, or Firm — Kilpatrick Townsend & Stockton LLP

(57) ABSTRACT

An armrest control mechanism for a passenger seat may be attached to a seat frame and an armrest to control movement of the armrest relative to the seat frame. The armrest control mechanism may include a base member, a gas spring, a pulley attached to the gas spring and moveable relative to the base member, and a cable movable relative to the base member for moving the pulley. The gas spring may provide forces through the pulley and the cable to the armrest.

20 Claims, 7 Drawing Sheets

ARMREST CONTROL MECHANISM FOR PASSENGER SEAT

FIELD OF THE INVENTION

The field of the invention relates to passenger seats and, more particularly, to systems and methods for controlling movement of armrests from a stowed position to a deployed position.

BACKGROUND

Passenger vehicles, such as aircraft, busses, trains, ships, and automobiles often include one or more passenger seats in which passengers may be seated and otherwise use during travel. Many passenger seats include one or more armrests that a passenger may use to rest his or her arm. Some armrests are pivotable relative to the passenger seat, and movement between a stowed position and a deployed position is achieved by pivoting the armrest about a pivot axis. Other armrests are translatable or movable in a vertical direction between a stowed (or high) position in which the passenger can comfortably rest his or her arm and a deployed (or low) position in which the armrest may be the same height as a base or seating part of the passenger seat. In some cases, vertically movable armrests may be movable between the stowed and deployed positions so as to facilitate access to the seat for a disabled person. Traditional approaches to controlling movement of vertically movable armrests have relied upon the strength of the flight attendant and/or coil springs. For example, a flight attendant may be required to support the entire weight of the armrest to avoid free fall of the armrest when moving from the stowed position to the deployed position and conversely may be required to lift the entire weight when moving from the deployed position to the stowed position. Coil springs may produce insufficient forces to support or control movement of the armrest and/or may result in undesired oscillations of the armrest.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a passenger seat includes a seat frame, an armrest moveable relative to the seat frame, and an armrest control mechanism attached to the seat frame and the armrest. The armrest control mechanism includes a base member, a gas spring, a pulley, and a cable. The gas spring includes a first end attached to the base member and a second end moveable relative to the base member, and the pulley is attached to the second end of the gas spring and moveable relative to the base member. The cable includes a first end, a second end, and an intermediate portion. The first end of the cable is attached to an anchor location on the base member, the second end of the cable is moveable relative to the base member, and the intermediate portion extends at least partially around the first pulley and engages with the first pulley. In various embodiments, the first pulley is moveable based on a movement of the second end of the cable. In certain embodiments, the base member is attached to one of the seat frame or the armrest and the second end of the cable is attached to the other of the seat frame or the armrest.

According to certain embodiments of the present invention, a method of assembling an armrest for a passenger seat relative to a seat frame of the passenger seat includes supporting the armrest relative to the seat frame such that the armrest is vertically movable between a stowed position and a deployed position, and attaching an armrest control mechanism to the seat frame and the armrest for controlling vertical movement of the armrest relative to the seat frame.

According to certain embodiments of the present invention, an armrest control mechanism includes a base member, a gas spring, a pulley, and a cable. The gas spring includes a piston and cylinder, where the piston is movable relative to the cylinder and the cylinder is attached to the base member. The pulley is attached to the piston of the gas spring such that the first pulley is moveable relative to the base member. The cable includes a first end, a second end, and an intermediate portion between the first end and the second end. In various embodiments, the first end of the cable is attached to the base member, the second end of the cable is moveable relative to the base member, and the intermediate portion extends at least partially around and engages with the first pulley. In certain embodiments, the first pulley is moveable based on a movement of the second end of the cable. In various embodiments, the base member is attachable to one of a seat frame of a passenger seat or an armrest of the passenger seat and the second end of the cable is attachable to the other of the seat frame or the armrest.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Described herein are systems and methods for controlling vertical movement of an armrest for passenger seats. While the armrest control mechanisms are discussed for use with aircraft seats, they are by no means so limited. Rather, embodiments of the armrest control mechanism may be used in passenger seats or other seats of any type or otherwise as desired.

Figure 1:
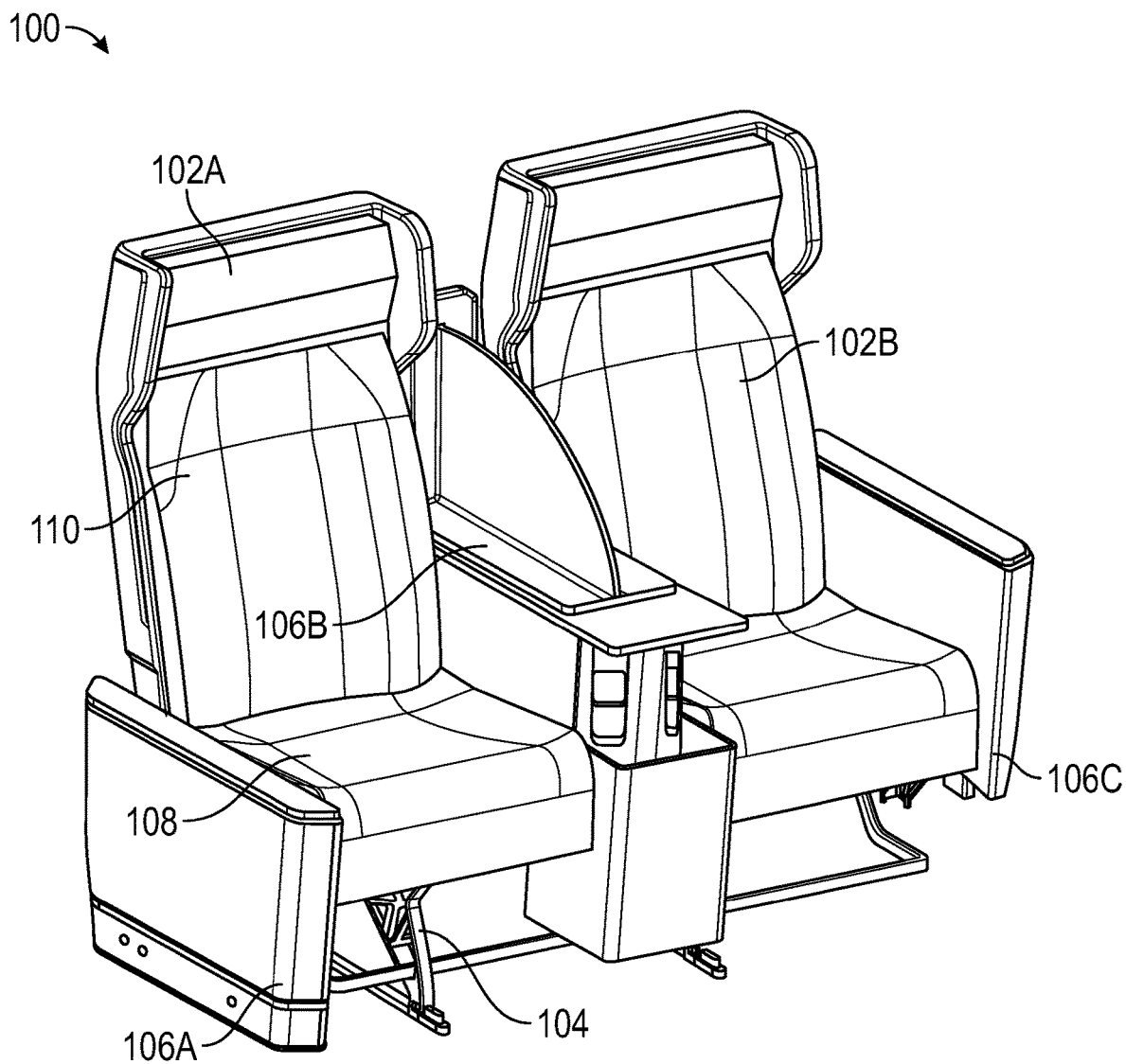
FIG. 1 is a perspective view of a passenger seat assembly with an armrest and an armrest control mechanism according to embodiments.
Figure 2A:
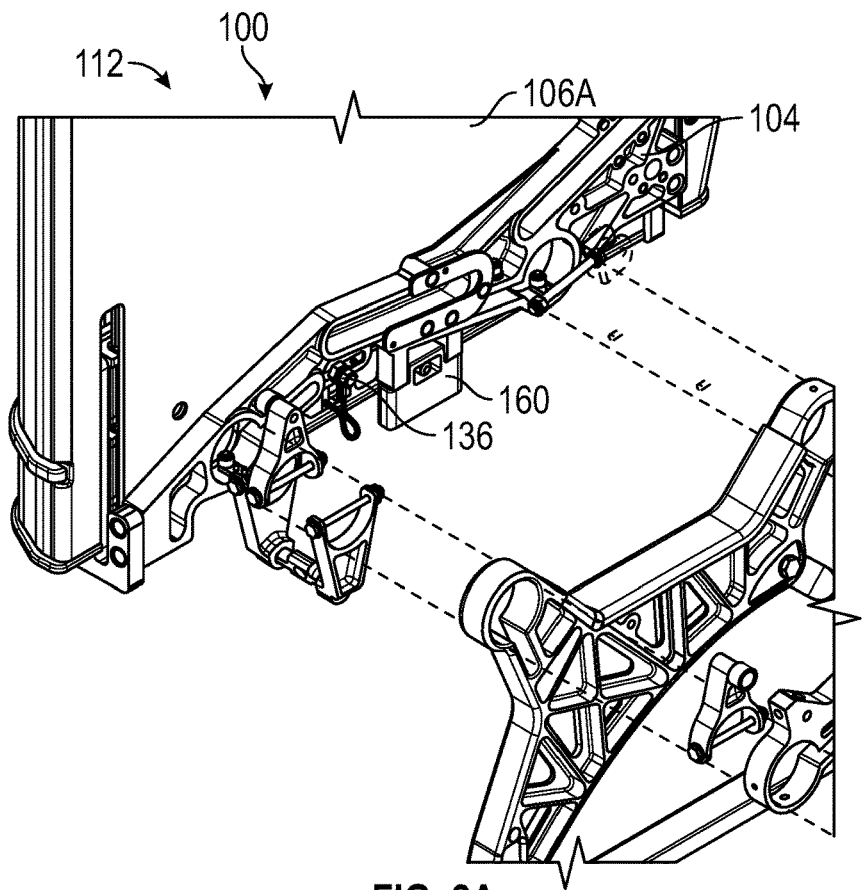
FIG. 2A illustrates the armrest of FIG. 1 in a deployed position.
Figure 2B:
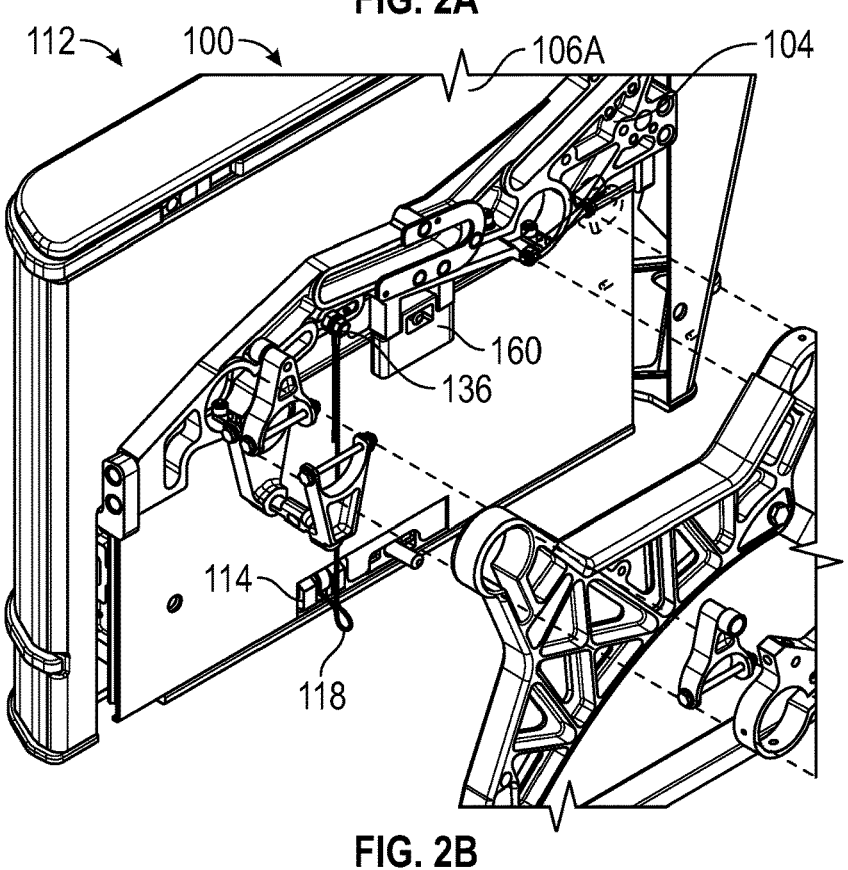
FIG. 2B illustrates the armrest of FIG. 1 in a stowed position.

FIGS. 1-2B illustrate a passenger seat assembly 100 according to various embodiments. The passenger seat assembly 100 is illustrated with two passenger seats 102A-B, although in other embodiments, the passenger seat assembly 100 may include any number of passenger seats 102 as desired, such as but not limited to a single passenger seat 102, two passenger seats 102, three passenger seats 102, etc. Each passenger seat 102 generally includes a seat frame 104 for supporting one or more cushioning and/or support elements for supporting a passenger such as but not limited to a seat base 108 and/or a backrest 110. In embodiments with a plurality of seats 102, a common seat frame component (e.g., a frame for the seat base 108) optionally may be used for more than one seat 102, although it need not in other embodiments.

In various embodiments, and as illustrated in FIG. 1, the passenger seat assembly 100 includes one or more armrests 106 associated with a given passenger seat 102 for a passenger to rest his or her arm. Whereas other passenger seats may utilize pivotable armrests that are pivotable between a stowed position and deployed position, the armrests 106 described herein are vertically movable or translatable between a stowed (or high) position and a deployed (or low) position. In FIG. 1, the armrest 106A is in the deployed position and armrests 106B-C are in the stowed positions. Similarly, FIG. 2A illustrates the armrest 106A in the stowed position and FIG. 2B illustrates the armrest 106B in the deployed position. As illustrated, in the deployed position, the armrest 106 may be at a lowered position relative to a seat base 108. In certain embodiments, the armrest 106 may be movable to the deployed position to facilitate access to the passenger seat 102 for a disabled person. Various support mechanisms may be utilized to support the armrest 106 relative to the seat frame 104 such that the armrest 106 is vertically movable, such as but not limited to rails, linear actuators, links, hinges, combinations thereof, and/or other mechanisms or combinations of mechanisms as desired.

In various embodiments, the passenger seat assembly 100 includes an armrest control mechanism 112 for facilitating control of movement of the armrest 106 relative to the seat frame 104 between the stowed and deployed positions. The armrest control mechanism 112 may be attached to both the seat frame 104 and the armrest 106. In some embodiments, the armrest control mechanism 112 may resist motion of the armrest 106 moving downwards from the stowed position to the deployed position and may prevent the armrest 106 from free-falling downwards. Additionally, or alternatively, the armrest control mechanism 112 may provide an assist load for moving the armrest 106 upwards from the deployed position to the stowed position. Compared to traditional approaches, the armrest control mechanism 112 may provide a compact mechanism for reliably controlling vertical movement of the armrest 106. In one non-limiting example, the armrest control mechanism 112 advantageously may provide a reliable way to control deployment speed of a high-weight armrest while fitting within a small space, such as a space defined within the armrest and/or on the seat frame 104. Various other benefits and advantages may be realized with the systems and methods described herein, and the aforementioned benefits and advantages should not be considered limiting.

FIGS. 3A-6 illustrate the armrest control mechanism 112 in greater detail. In various embodiments, the armrest control mechanism 112 includes a base member 114, a gas spring 116, a cable 118, a first pulley 120, and a second pulley 122.

The base member 114 generally includes a first side 124 and a second side 125 opposite from the first side 124. In some embodiments, the base member 114 may be supported on the armrest 106, while in other embodiments, the base member 114 may be supported on the seat frame 104.

Figure 3A:
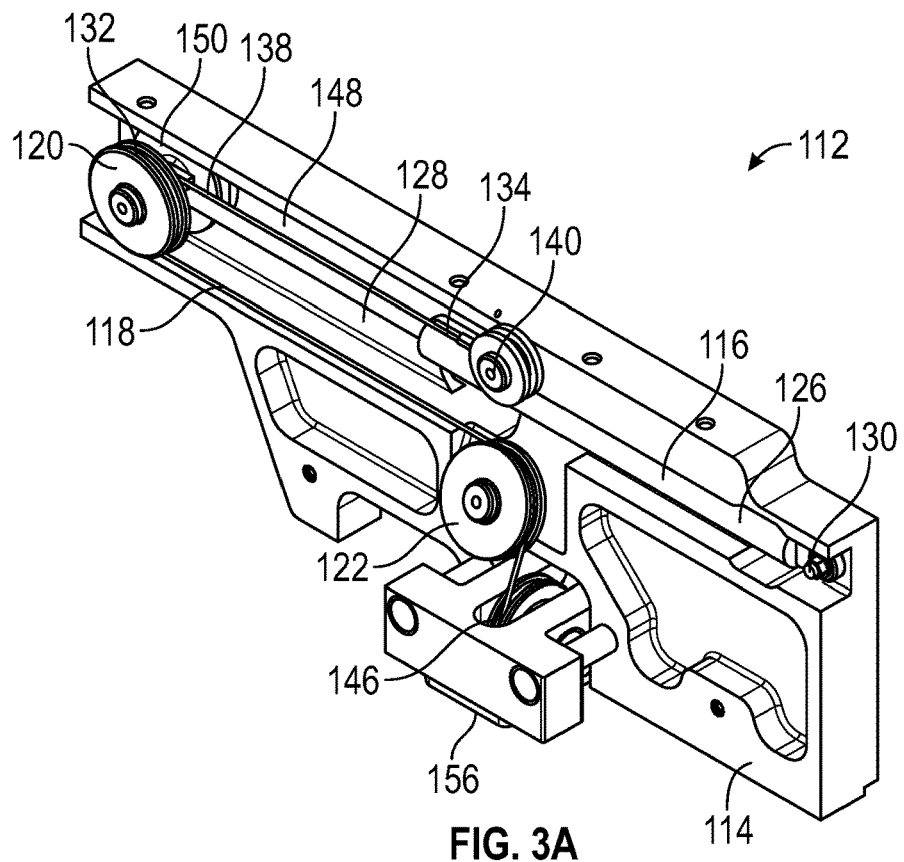
FIGS. 3A-B are top perspective views of a portion of the armrest control mechanism of FIG. 1 in a stowed configuration.
Figure 3B:
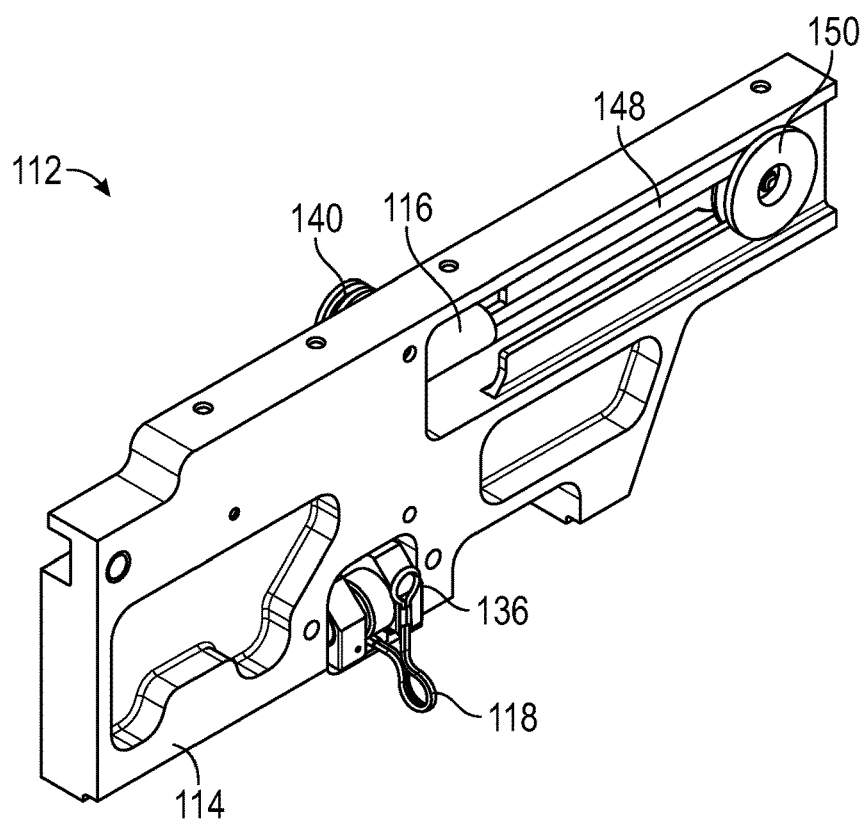
Figure 4A:
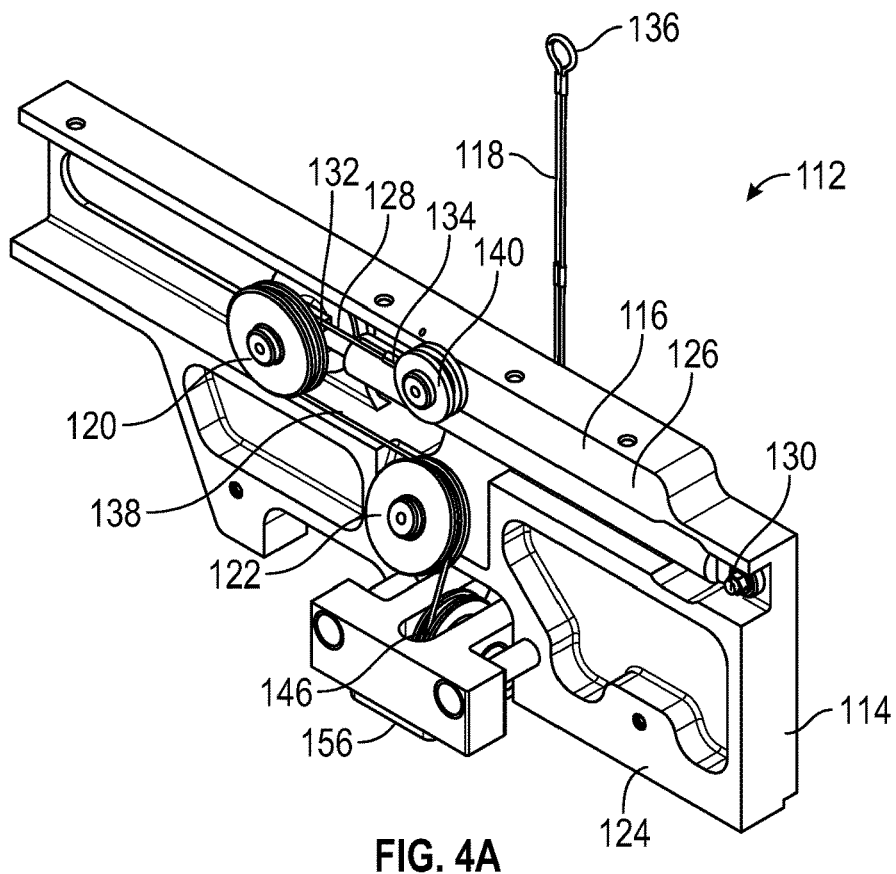
FIGS. 4A-B are top perspective views of the portion of the armrest control mechanism of FIG. 1 in a deployed configuration.
Figure 4B:
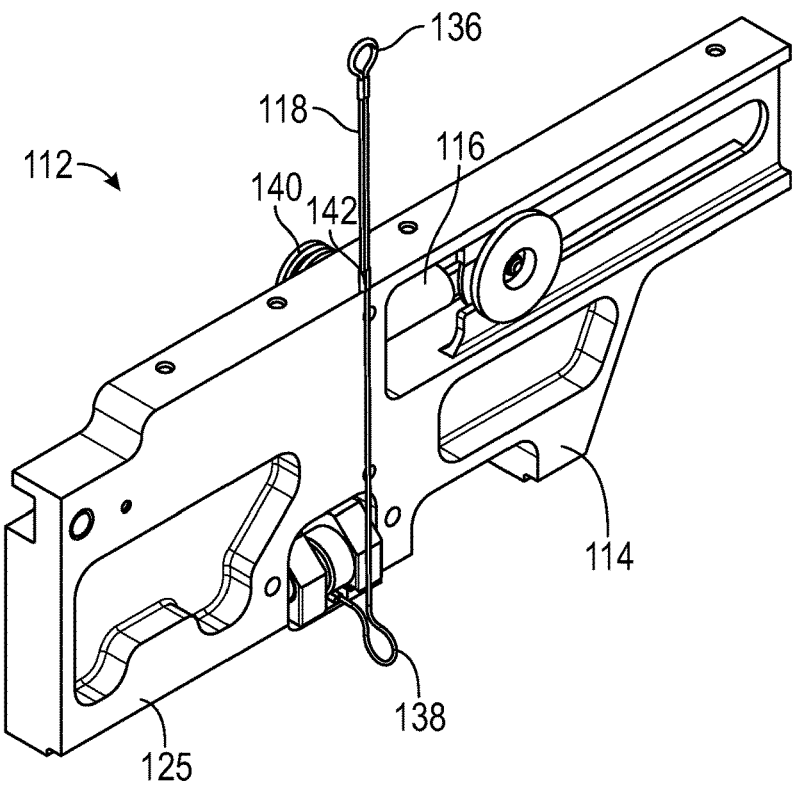

The gas spring 116 includes a cylinder 126 and a piston 128 that is movable relative to the cylinder 126. In certain embodiments, the piston 128 is linearly movable relative to the cylinder 126 between an extended position (FIGS. 3A-B) and a retracted position (FIGS. 4A-B). In various embodiments, and as discussed in detail below, the extended position of the piston 128 may correspond with the stowed position of the armrest 106 and the retracted position of the piston 128 may correspond with the deployed position of the armrest 106. In various embodiments, the cylinder 126 may define a first end 130 of the gas spring 116 and the piston 128 defines a second end 132 of the gas spring 116. As best illustrated in FIGS. 3A and 4A, the gas spring 116 may be supported on one of the sides (e.g., the first side 124) of the base member 114 using various mechanisms as desired, such as but not limited to mechanical fasteners. In certain embodiments, the gas spring 116 is supported on the base member 114 such that the first end 130 is fixed relative to the base member 114 while the second end 132 is movable relative to the base member 114.

Optionally, and as illustrated in FIGS. 3A-4B, the base member 114 may define a guide track 148. In such embodiments, a guide member 150 may be supported on the piston 128, optionally at or proximate to the second end 132, and movable along the guide track 148. The guide member 150 and guide track 148 may facilitate movement of the piston 128 between the extended position and the retracted position.

The cable 118 of the armrest control mechanism 112 generally includes a first end 134, a second end 136, and an intermediate portion 138 between the first end 134 and the second end 136. In various embodiments, the first end 134 of the cable 118 may be attached to an anchor location 140 on the base member 114 such that the first end 134 is fixed relative to the base member 114. The second end 136 of the cable 118 may be attached to the seat frame 104 or the armrest 106. In various embodiments, the base member 114 may be supported on one of the seat frame 104 or the armrest 106, and the second end 136 of the cable 118 may be attached to the other of the seat frame 104 or the armrest 106. In the embodiment best illustrated in FIGS. 2A-B, the base member 114 is supported on the armrest 106 and the second end 136 attached to the seat frame 104.

Attachment of the second end 136 of the cable 118 to the armrest 106 and/or the seat frame 104 allows for relative movement between the second end 136 and the base member 114, which in turn facilitates movement of the armrest 106 between the stowed position and the deployed position. In various embodiments, the second end 136 is movable between a stowed position (see FIGS. 3A-B) and a deployed position (see FIGS. 4A-B) relative to the base member 114. The stowed position of the second end 136 may correspond with the stowed position of the armrest 106 and the deployed position of the second end 136 may correspond with the deployed position of the armrest 106.

The first pulley 120 and the second pulley 122 are adapted to receive and guide the cable 118 on the base member 114. In certain embodiments, the first pulley 120 is supported on the piston 128, optionally at or proximate to the second end 132, such that the first pulley 120 is movable relative to the base member 114. The second pulley 122 of the armrest control mechanism 112 may be supported on the base member 114 at a fixed location. In some embodiments, the fixed location of the second pulley 122 is at a vertical position below the anchor location 140, although in other embodiments, in need not be. As a non-limiting example, the fixed location may be at a vertical position above the anchor location 140. In some embodiments, the fixed location and anchor location 140 are vertically aligned, although they need not be in other embodiments.

The first pulley 120 and the second pulley 122 together define a guide path for the cable 118. In some embodiments, the guide path for the cable 118 may be defined on one side (e.g., the first side 124) of the base member 114, while in other embodiments and as illustrated in FIGS. 3A-6, the guide path for the cable 118 may be on both sides 124, 125 of the base member 114. As such, depending on the desired guide path, the armrest control mechanism 112 optionally includes supplemental pulleys in addition to the first pulley 120 and the second pulley 122. In the embodiment illustrated in FIGS. 3A-6, the armrest control mechanism 112 further includes an optional crossover pulley 146 for guiding the cable 118 from the second pulley 122 on the first side 124 to the second side 125 of the base member 114.

As best illustrated in FIGS. 3A-4B, in certain embodiments, the guide path for the cable 118 extends from the anchor location 140 to the first pulley 120, from the first pulley 120 to the second pulley 122, and from the second pulley 122 towards the armrest 106 and/or seat frame 104 to which the second end 136 of the cable 118 is attached. In such embodiments, the intermediate portion 138 of the cable 118 may extend at least partially around the first pulley 120 and at least partially around the second pulley 122.

In various embodiments, the guide path for the cable 118 from the anchor location 140 to the first pulley 120 may extend in a first direction and the guide path for the cable 118 from the second pulley 122 towards the armrest 106 and/or the seat frame 104 may be in a second direction that is different from the first direction. In various embodiments, the second direction may be perpendicular to the second direction, although it need not be in other embodiments. As a non-limiting example, when the armrest control mechanism 112 is installed with passenger seat 102, the first direction may be in a forward-aft direction, and the second direction may be in a side-to-side direction and/or a vertical direction. In a non-limiting example, the first direction may be the forward-aft direction, and the second direction may be in the vertical direction.

Optionally, the guide path from the second pulley 122 towards the armrest 106 and/or the seat frame 104 may be in a plurality of directions (e.g., the second direction and at least one other direction) that is different from the first direction, such as but not limited to when the armrest control mechanism 112 includes the crossover pulley 146. In the embodiment illustrated in FIGS. 3A-6, the first direction is in the forward-aft direction, and the guide path from the second pulley 122 towards the armrest 106 extends both in a vertical direction and a side-to-side direction via the crossover pulley 146. Various other configurations of the guide path may be utilized as desired.

In various embodiments, the guide path for the cable 118 from the first pulley 120 to the second pulley 122 may be in the same direction and/or in a direction that is parallel to that of the first direction. In certain embodiments, the first direction may be parallel to a direction of linear movement of the piston 128 of the gas spring 116.

In certain embodiments, a length of travel of the second end 136 between the stowed position (see FIGS. 3A-B) and the deployed position (see FIGS. 4A-B) may directly correlate with a length of travel of the first pulley 120 (via the piston 128) relative to the anchor location 140 (e.g., between retracted and extended positions of the piston 128). In certain embodiments, the length of travel of the second end 136 between the stowed and deployed positions may be twice (2×) the length of travel of the first pulley 120.

Figure 5:
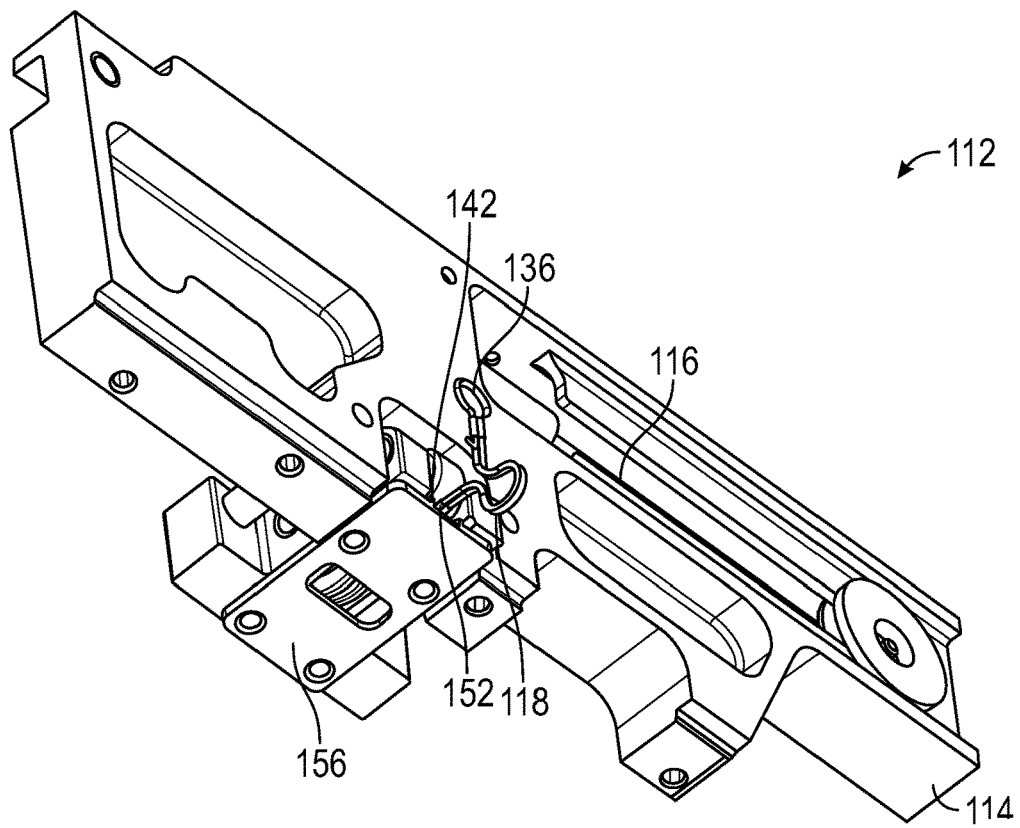
FIG. 5 is a bottom perspective view of the portion of the armrest control mechanism of FIG. 1.
Figure 6:
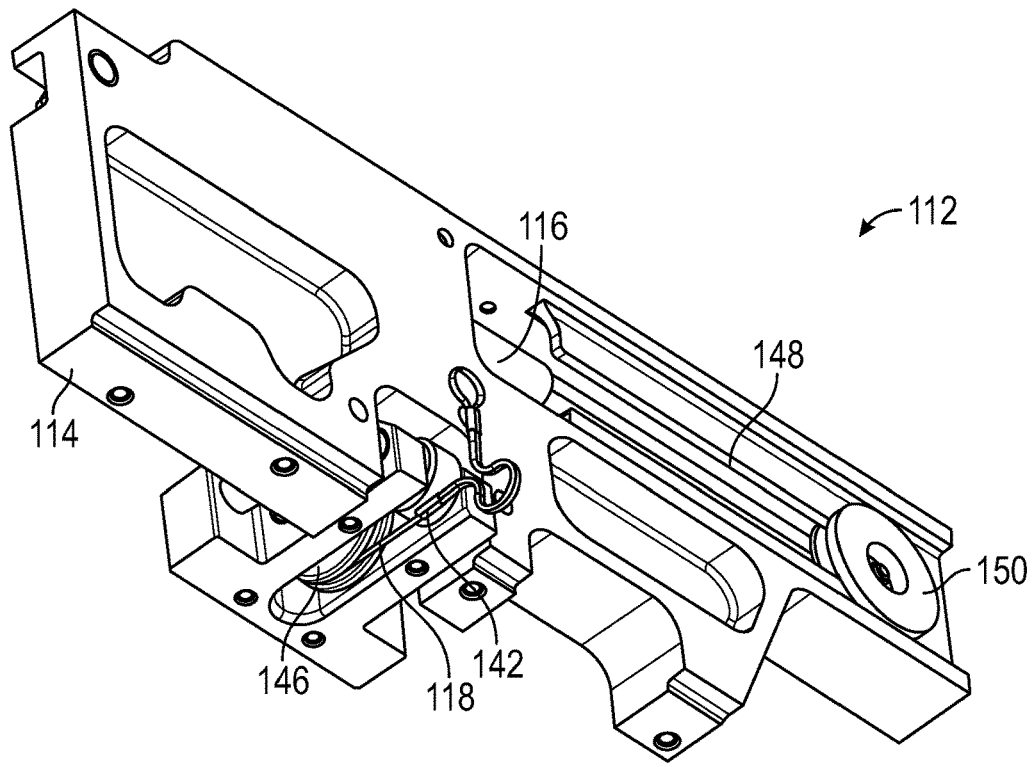
FIG. 6 is another bottom perspective view of the portion of the armrest control mechanism of FIG. 1 with a bottom cover removed.
Figure 7:
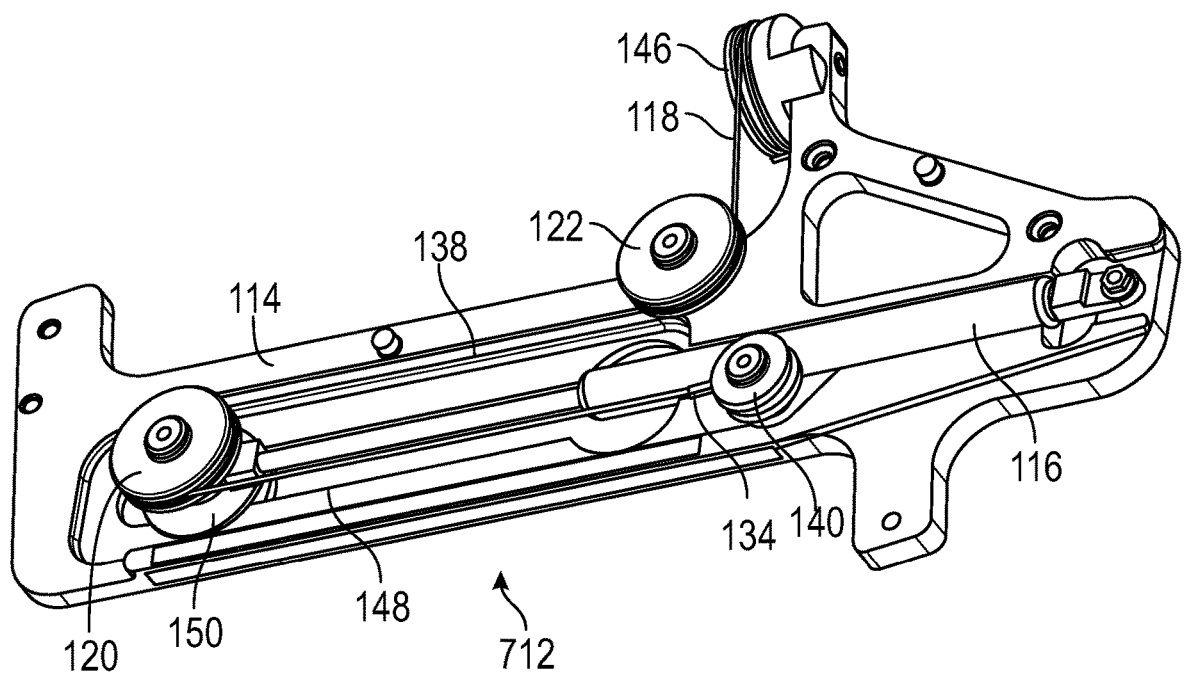
FIG. 7 is a perspective view of an armrest control mechanism according to embodiments.
Figure 8:
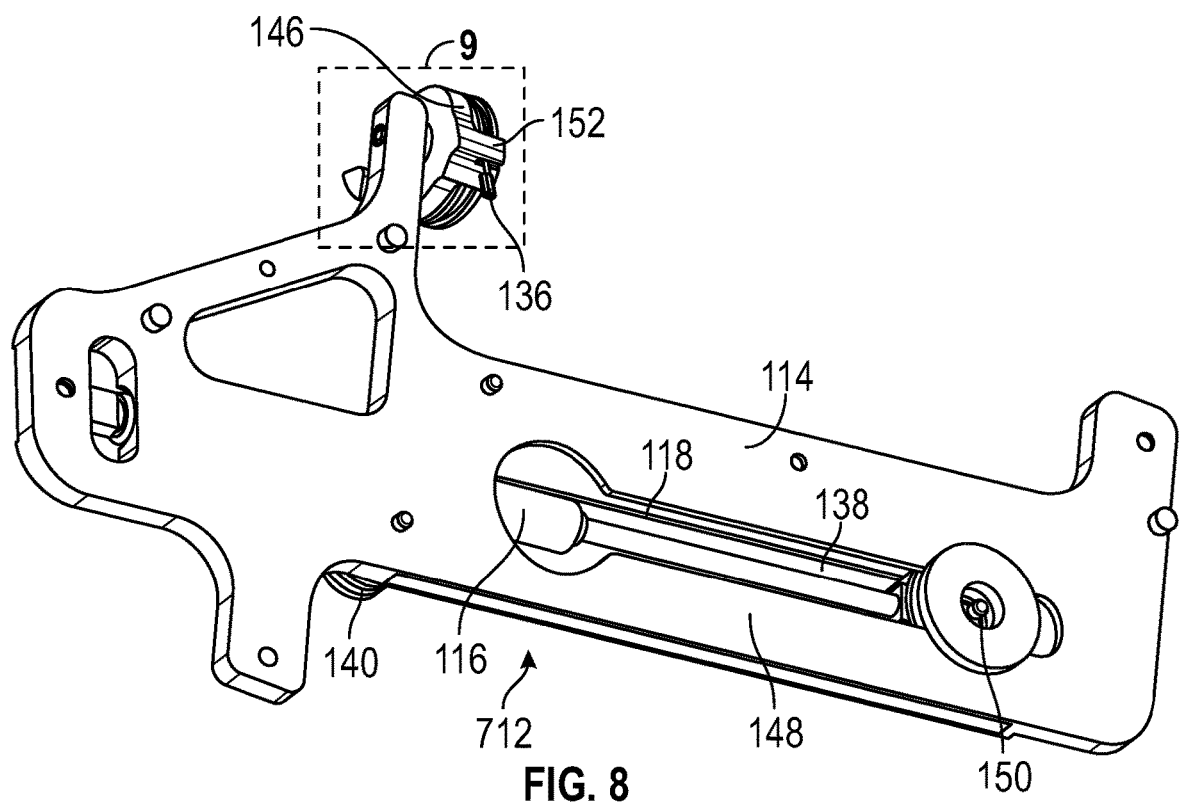
FIG. 8 is another perspective view of the armrest control mechanism of FIG. 7.
Figure 9:
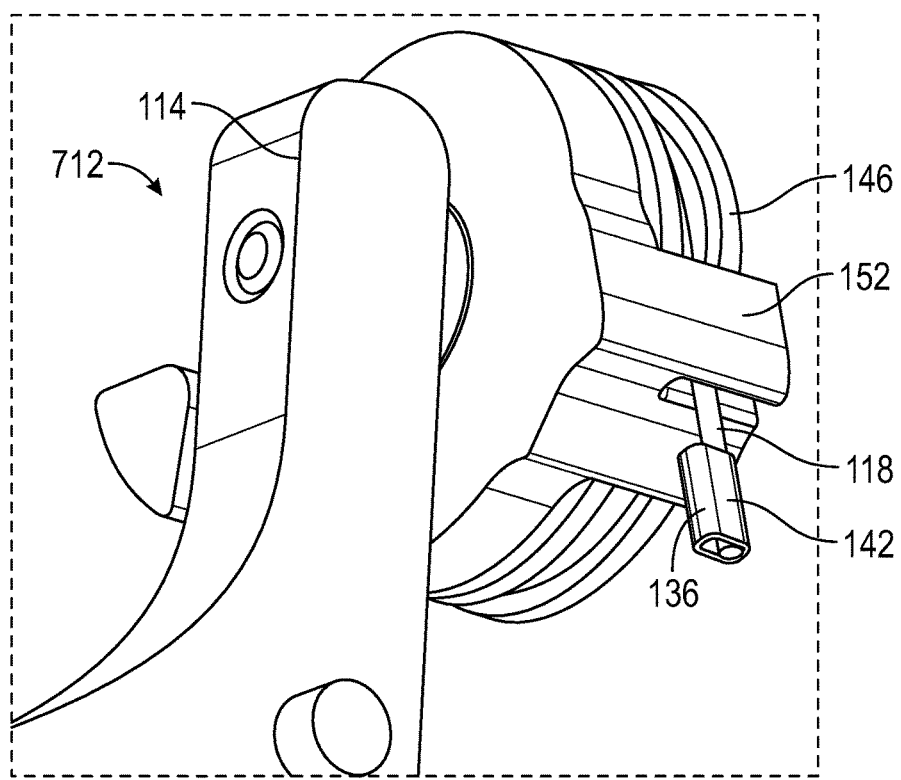
FIG. 9 illustrates a portion of the armrest control mechanism of FIG. 7 taken from box 9 in FIG. 8.

Optionally, the cable 118 includes one or more stoppers 142 along the cable 118 for controlling a length of travel of the cable 118 relative to the base member 114 and/or for defining the stowed position of the cable 118 relative to the base member 114. When the one or more stoppers 142 are included, the stoppers 142 may engage a corresponding stopper 152 on the base member 114 to limit further relative movement of the cable 118. In some embodiments, and as best illustrated in FIGS. 5 and 6, the stopper 152 may be a stopper plate 156 supported on the base 114. FIGS. 7-10 illustrate another example of an armrest control system 712 that is similar to the armrest control system 712 except that the stopper 152 is provided directly on the crossover pulley 146. Other configurations of stoppers may be utilized as desired. Moreover, as previously discussed, the crossover pulley 146 need not be included, and the guide path for the cable 118 optionally may be provided only on a single side of the base member 114.

Figure 10:
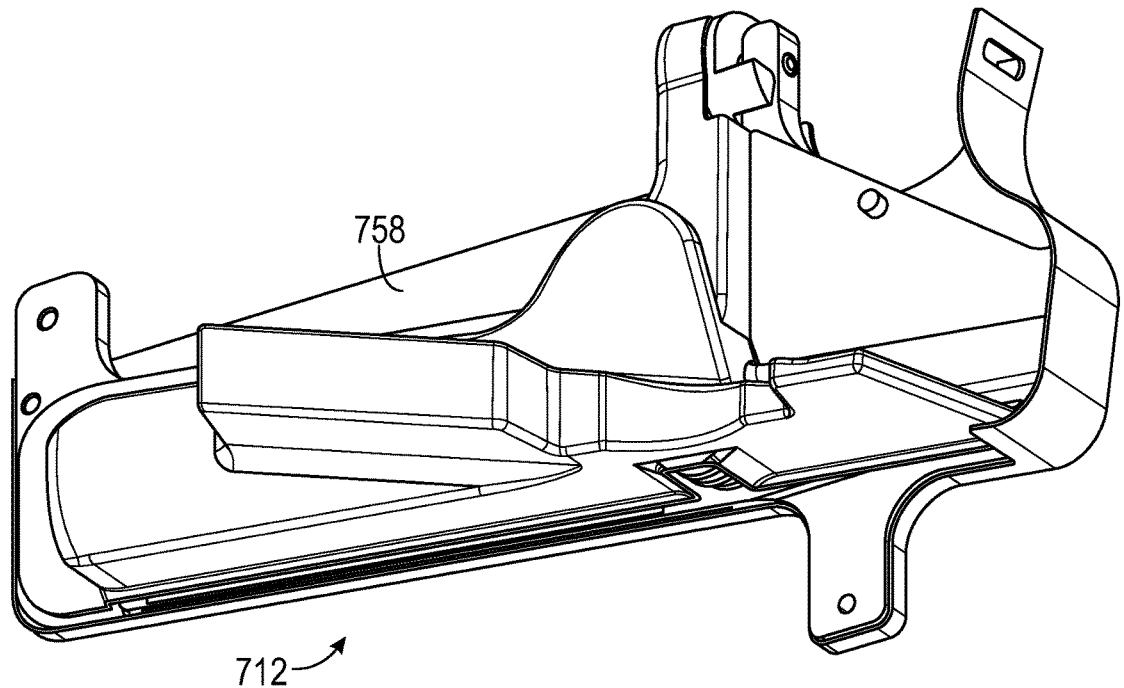
FIG. 10 illustrates the armrest control mechanism of FIG. 7 with a cover according to embodiments.

Optionally, and as illustrated in FIG. 10, one or more covers 758 may be provided to house and/or substantially cover the components of the armrest control systems described herein. When included, the one or more covers 758 may isolate the components of the armrest control system from other components of the armrest 106 and/or seat frame 104 and/or may provide one or more locations for mounting the armrest control system on the armrest 106 and/or seat frame 104.

Referring back to FIGS. 2A-B, the armrest control mechanism 112 may assist in raising and lowering the armrest 106 by applying forces through a cable 118 and using the gas spring 116. In various examples, the armrest control mechanism 112, using the gas spring 116, may apply a resistive force to the armrest 106 as the armrest 106 moves in a downward direction, towards the deployed position illustrated in FIG. 2A. In particular, a rate at which the piston 128 moves from the extended position to the retracted position may provide a force to the cable 118 resisting and/or counteracting the weight of the armrest 106, thereby providing a reliable and controlled movement of the armrest 106 from the stowed position to the deployed position. Conversely, the armrest control mechanism 112, using the gas spring 116, may apply an assisting force to the armrest 106 as the armrest 106 moves in an upward direction, towards the stowed position illustrated in FIG. 2B. In particular, the piston 128 may be driven and/or otherwise forced to move from the retracted position to the extended position, thereby applying a force to the cable 118 assisting with the upward movement of the armrest 106, which provides a reliable and controlled movement of the armrest 106 from the deployed position to the stowed position.

Optionally, and as illustrated in FIGS. 2A-B, for example, the armrest control mechanism 112 includes a latch 160, which is movable between an engaged state and a disengaged state. In the engaged state, latch 160 may restrict and/or prevent movement of the armrest 106 relative to the seat frame 104, while in the disengaged state, the armrest 106 may be movable relative to the seat frame 104.

A collection of exemplary embodiments is provided below, including at least some explicitly enumerated as an "Illustration" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A passenger seat comprising: a seat frame; an armrest moveable relative to the seat frame; and an armrest control mechanism attached to the seat frame and the armrest, the armrest control mechanism comprising: a base member; a gas spring comprising a first end attached to the base member and a second end moveable relative to the base member; a first pulley attached to the second end of the gas spring and moveable relative to the base member; and a cable comprising a first end, a second end, and an intermediate portion, wherein the first end of the cable is attached to an anchor location on the base member, the second end of the cable is moveable relative to the base member, and the intermediate portion extends at least partially around the first pulley and engages with the first pulley, wherein the first pulley is moveable based on a movement of the second end of the cable, and wherein the base member is attached to one of the seat frame or the armrest and the second end of the cable is attached to the other of the seat frame or the armrest.

Illustration 2. The passenger seat of any preceding or subsequent illustration or combination of illustrations, wherein the base member comprises a guide track and the gas spring further comprises a guide member at the second end, wherein the first pulley is attached to the guide member, and wherein the guide member is movable along the guide track.

Illustration 3. The passenger seat of any preceding or subsequent illustration or combination of illustrations, wherein the cable extends in a first direction from the first end to the first pulley and in a second direction from the base member to the second end, wherein the second direction is different from the first direction.

Illustration 4. The passenger seat of any preceding or subsequent illustration or combination of illustrations, wherein the first direction is perpendicular to the second direction.

Illustration 5. The passenger seat of any preceding or subsequent illustration or combination of illustrations, wherein the second end of the cable is movable between a stowed position and a deployed position, and wherein the first pulley is linearly movable between a stowed position and a deployed position, and wherein a length of travel of the second end of the cable between the stowed position and the deployed position is different from a length of travel of the first pulley from the stowed position to the deployed position.

Illustration 6. The passenger seat of any preceding or subsequent illustration or combination of illustrations, wherein the length of travel of the second end between the stowed position and the deployed position is twice the length of travel of the first pulley between the stowed position and the deployed position.

Illustration 7. The passenger seat of any preceding or subsequent illustration or combination of illustrations, wherein the armrest control mechanism applies a resistive force to the armrest as the armrest moves in a downward direction, and the armrest control mechanism applies an assisting force to the armrest as the armrest moves in an upward direction.

Illustration 8. The passenger seat of any preceding or subsequent illustration or combination of illustrations, further comprising a release latch attached to the armrest, wherein the release latch is operable between an engaged state and a disengaged state, wherein, in the engaged state, the release latch locks the armrest relative to the seat frame, and wherein, in the disengaged state, the armrest is moveable relative to the seat frame.

Illustration 9. A method of assembling an armrest for a passenger seat relative to a seat frame of the passenger seat, the method comprising: supporting the armrest relative to the seat frame such that the armrest is vertically movable between a stowed position and a deployed position; and attaching an armrest control mechanism to the seat frame and the armrest for controlling vertical movement of the armrest relative to the seat frame, wherein the armrest control mechanism comprises: a base member; a gas spring comprising a first end attached to the base member and a second end moveable relative to the first end and relative to the base member; a first pulley attached to the second end of the gas spring and moveable relative to the base member; and a cable comprising a first end, a second end, and an intermediate portion between the first end and the second end, wherein the first end of the cable is attached to an anchor location on the base member, the second end of the cable is moveable relative to the base member, and the intermediate portion extends at least partially around and engages with the first pulley, wherein the first pulley is moveable based on a movement of the second end of the cable, and wherein attaching the armrest control mechanism to the seat frame and the armrest comprises attaching the base member to one of the seat frame or the armrest and attaching the second end of the cable to the other of the seat frame or the armrest.

Illustration 10. The method of any preceding or subsequent illustration or combination of illustrations, wherein attaching the armrest control mechanism comprises guiding the cable such that the cable extends in a first direction from the first end to the first pulley and in a second direction from the base member to the second end, wherein the second direction is different from the first direction.

Illustration 11. The method of any preceding or subsequent illustration or combination of illustrations, wherein the first direction is perpendicular to the second direction.

Illustration 12. The method of any preceding or subsequent illustration or combination of illustrations, wherein the second end of the cable is movable between a stowed position and a deployed position, and wherein the first pulley is linearly movable between a stowed position and a deployed position, and wherein the method comprises guiding the cable on the armrest control mechanism such that a length of travel of the second end of the cable between the stowed position and the deployed position is different from a length of travel of the first pulley from the stowed position to the deployed position, wherein the length of travel of the second end between the stowed position and the deployed position is twice the length of travel of the first pulley between the stowed position and the deployed position.

Illustration 13. An armrest control mechanism comprising: a base member; a gas spring comprising a piston and cylinder, wherein the piston is movable relative to the cylinder, and wherein the cylinder is attached to the base member; a first pulley attached to the piston of the gas spring such that the first pulley is moveable relative to the base member; and a cable comprising a first end, a second end, and an intermediate portion between the first end and the second end, wherein the first end of the cable is attached to the base member, the second end of the cable is moveable relative to the base member, and the intermediate portion extends at least partially around and engages with the first pulley, wherein the first pulley is moveable based on a movement of the second end of the cable, and wherein the base member is attachable to one of a seat frame of a passenger seat or an armrest of the passenger seat and the second end of the cable is attachable to the other of the seat frame or the armrest.

Illustration 14. The armrest control mechanism of any preceding or subsequent illustration or combination of illustrations, wherein the base member comprises a guide track, wherein the first pulley is attached to a guide member, and wherein the guide member is moveable along the guide track.

Illustration 15. The armrest control mechanism of any preceding or subsequent illustration or combination of illustrations, further comprising a second pulley attached to the base member, wherein a guide path for the cable extends from the anchor location, around the first pulley, and around the second pulley toward the seat frame or the armrest.

Illustration 16. The armrest control mechanism of any preceding or subsequent illustration or combination of illustrations, wherein the guide path for the cable between the anchor location and the first pulley is parallel to the guide path for the cable between the anchor location and the second pulley.

Illustration 17. The armrest control mechanism of any preceding or subsequent illustration or combination of illustrations, wherein the guide path for the cable between the anchor location and the first pulley is in a first direction, and wherein a guide path for the cable from the second pulley toward the seat frame or the armrest is in a second direction different from the first direction.

Illustration 18. The armrest control mechanism of any preceding or subsequent illustration or combination of illustrations, wherein the first direction is perpendicular to the second direction.

Illustration 19. The armrest control mechanism of any preceding or subsequent illustration or combination of illustrations, wherein the gas spring and second pulley are supported on a first side of the base member, wherein the armrest further comprises a cable stopper for the cable on a second side of the base member, and wherein the guide path for the cable further extends from the first side of the base member to the second side of the base member.

Illustration 20. The armrest control mechanism of any preceding or subsequent illustration or combination of illustrations, wherein the second end of the cable is movable between a stowed position and a deployed position, and wherein the first pulley is linearly movable between a stowed position and a deployed position, and wherein the method comprises guiding the cable on the armrest control mechanism such that a length of travel of the second end of the cable between the stowed position and the deployed position is different from a length of travel of the first pulley from the stowed position to the deployed position, wherein the length of travel of the second end between the stowed position and the deployed position is twice the length of travel of the first pulley between the stowed position and the deployed position.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. In the figures and the description, like numerals are intended to represent like elements. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". As used herein, the meaning of "a," "an," and "the" includes singular and plural references unless the context clearly dictates otherwise.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed is:

1. A passenger seat comprising:
a seat frame;
an armrest moveable relative to the seat frame; and
an armrest control mechanism attached to the seat frame and the armrest, the armrest control mechanism comprising:
a base member;
a gas spring comprising a first end attached to the base member and a second end moveable relative to the base member;
a first pulley attached to the second end of the gas spring and moveable relative to the base member; and
a cable comprising a first end, a second end, and an intermediate portion, wherein the first end of the cable is attached to an anchor location on the base member, the second end of the cable is moveable relative to the base member, and the intermediate portion extends at least partially around the first pulley and engages with the first pulley,
wherein the first pulley is moveable based on a movement of the second end of the cable, and
wherein the base member is attached to one of the seat frame or the armrest and the second end of the cable is attached to the other of the seat frame or the armrest.

2. The passenger seat of claim 1, wherein the base member comprises a guide track and the gas spring further comprises a guide member at the second end, wherein the first pulley is attached to the guide member, and wherein the guide member is movable along the guide track.

3. The passenger seat of claim 1, wherein the cable extends in a first direction from the first end to the first pulley and in a second direction from the base member to the second end, wherein the second direction is different from the first direction.

4. The passenger seat of claim 3, wherein the first direction is perpendicular to the second direction.

5. The passenger seat of claim 1, wherein the second end of the cable is movable between a stowed position and a deployed position, and wherein the first pulley is linearly movable between a stowed position and a deployed position, and wherein a length of travel of the second end of the cable between the stowed position and the deployed position is different from a length of travel of the first pulley from the stowed position to the deployed position.

6. The passenger seat of claim 5, wherein the length of travel of the second end between the stowed position and the deployed position is twice the length of travel of the first pulley between the stowed position and the deployed position.

7. The passenger seat of claim 1, wherein the armrest control mechanism applies a resistive force to the armrest as the armrest moves in a downward direction, and the armrest control mechanism applies an assisting force to the armrest as the armrest moves in an upward direction.

8. The passenger seat of claim 1, further comprising a release latch attached to the armrest, wherein the release latch is operable between an engaged state and a disengaged state, wherein, in the engaged state, the release latch locks the armrest relative to the seat frame, and wherein, in the disengaged state, the armrest is moveable relative to the seat frame.

9. A method of assembling an armrest for a passenger seat relative to a seat frame of the passenger seat, the method comprising:
supporting the armrest relative to the seat frame such that the armrest is vertically movable between a stowed position and a deployed position; and
attaching an armrest control mechanism to the seat frame and the armrest for controlling vertical movement of the armrest relative to the seat frame, wherein the armrest control mechanism comprises:
a base member;
a gas spring comprising a first end attached to the base member and a second end moveable relative to the first end and relative to the base member;
a first pulley attached to the second end of the gas spring and moveable relative to the base member; and
a cable comprising a first end, a second end, and an intermediate portion between the first end and the second end, wherein the first end of the cable is attached to an anchor location on the base member, the second end of the cable is moveable relative to the base member, and the intermediate portion extends at least partially around and engages with the first pulley,
wherein the first pulley is moveable based on a movement of the second end of the cable, and
wherein attaching the armrest control mechanism to the seat frame and the armrest comprises attaching the base member to one of the seat frame or the armrest and attaching the second end of the cable to the other of the seat frame or the armrest.

10. The method of claim 9, wherein attaching the armrest control mechanism comprises guiding the cable such that the cable extends in a first direction from the first end to the first pulley and in a second direction from the base member to the second end, wherein the second direction is different from the first direction.

11. The method of claim 10, wherein the first direction is perpendicular to the second direction.

12. The method of claim 9, wherein the second end of the cable is movable between a stowed position and a deployed position, and wherein the first pulley is linearly movable between a stowed position and a deployed position, and wherein the method comprises guiding the cable on the armrest control mechanism such that a length of travel of the second end of the cable between the stowed position and the deployed position is different from a length of travel of the first pulley from the stowed position to the deployed position, wherein the length of travel of the second end between the stowed position and the deployed position is twice the length of travel of the first pulley between the stowed position and the deployed position.

13. An armrest control mechanism comprising:
a base member;
a gas spring comprising a piston and cylinder, wherein the piston is movable relative to the cylinder, and wherein the cylinder is attached to the base member;
a first pulley attached to the piston of the gas spring such that the first pulley is moveable relative to the base member; and
a cable comprising a first end, a second end, and an intermediate portion between the first end and the second end, wherein the first end of the cable is attached to the base member, the second end of the cable is moveable relative to the base member, and the intermediate portion extends at least partially around and engages with the first pulley,
wherein the first pulley is moveable based on a movement of the second end of the cable, and wherein the base member is attachable to one of a seat frame of a passenger seat or an armrest of the passenger seat and the second end of the cable is attachable to the other of the seat frame or the armrest.

14. The armrest control mechanism of claim 13, wherein the base member comprises a guide track, wherein the first pulley is attached to a guide member, and wherein the guide member is moveable along the guide track.

15. The armrest control mechanism of claim 13, further comprising a second pulley attached to the base member, wherein a guide path for the cable extends from an anchor location, around the first pulley, and around the second pulley toward the seat frame or the armrest.

16. The armrest control mechanism of claim 15, wherein the guide path for the cable between the anchor location and the first pulley is parallel to the guide path for the cable between the anchor location and the second pulley.

17. The armrest control mechanism of claim 15, wherein the guide path for the cable between the anchor location and the first pulley is in a first direction, and wherein a guide path for the cable from the second pulley toward the seat frame or the armrest is in a second direction different from the first direction.

18. The armrest control mechanism of claim 17, wherein the first direction is perpendicular to the second direction.

19. The armrest control mechanism of claim 18, wherein the gas spring and second pulley are supported on a first side of the base member, wherein the armrest further comprises a cable stopper for the cable on a second side of the base member, and wherein the guide path for the cable further extends from the first side of the base member to the second side of the base member.

20. The armrest control mechanism of claim 13, wherein the second end of the cable is movable between a stowed position and a deployed position, wherein the first pulley is linearly movable between a stowed position and a deployed position, wherein the cable is configured to be guided on the armrest control mechanism such that a length of travel of the second end of the cable between the stowed position and the deployed position is different from a length of travel of the first pulley from the stowed position to the deployed position, and wherein the length of travel of the second end between the stowed position and the deployed position is twice the length of travel of the first pulley between the stowed position and the deployed position.

* * * * *